United States Patent
Pedraza et al.

(10) Patent No.: US 7,272,395 B2
(45) Date of Patent: Sep. 18, 2007

(54) METHOD FOR SETTING PARAMETERS OF A CELLULAR RADIO NETWORK, IN PARTICULAR FOR ACCESS AND HANDOVER

(75) Inventors: Salvador Pedraza, Malaga (ES); Matias Toril, Malaga (ES)

(73) Assignee: Nokia Corporation, Espoo (FI)

( * ) Notice: Subject to any disclaimer, the term of this patent is extended or adjusted under 35 U.S.C. 154(b) by 20 days.

(21) Appl. No.: 10/493,160

(22) PCT Filed: Oct. 18, 2001

(86) PCT No.: PCT/EP01/12085

§ 371 (c)(1),
(2), (4) Date: May 13, 2004

(87) PCT Pub. No.: WO03/037017

PCT Pub. Date: May 1, 2003

(65) Prior Publication Data

US 2004/0253953 A1 Dec. 16, 2004

(51) Int. Cl.
*H04Q 7/20* (2006.01)

(52) U.S. Cl. .................. 455/436; 455/452.2

(58) Field of Classification Search ............ 455/452.2, 455/436–444; 370/331, 332
See application file for complete search history.

(56) References Cited

U.S. PATENT DOCUMENTS

| 5,241,685 A | 8/1993 | Bodin et al. |
| 5,465,390 A | 11/1995 | Cohen |
| 5,561,841 A | 10/1996 | Markus |
| 5,623,535 A * | 4/1997 | Leung et al. ............... 455/444 |
| 6,173,185 B1 | 1/2001 | Bernardin et al. |
| 6,330,429 B1 * | 12/2001 | He ......................... 455/67.11 |
| 6,754,500 B1 * | 6/2004 | He ......................... 455/452.1 |
| 6,782,262 B1 * | 8/2004 | Lundborg .................. 455/449 |
| 6,871,073 B1 * | 3/2005 | Boyer et al. ................ 455/450 |
| 7,031,710 B2 * | 4/2006 | Pedraza et al. ............ 455/436 |
| 2002/0068571 A1 * | 6/2002 | Ohlsson et al. ............ 455/442 |
| 2002/0183010 A1 * | 12/2002 | Catreux et al. ........... 455/67.1 |

FOREIGN PATENT DOCUMENTS

ES WO 00/25547 A * 4/2000

OTHER PUBLICATIONS

Bernardin et al, "Cell Radius Inaccuracy: A new Measure of Coverage Reliability", IEEE Transaction on Vehicular Technology, vol. 47, No. 4, Nov. 1998, pp. 1215-1226, XP000875431.

* cited by examiner

*Primary Examiner*—William Trost
*Assistant Examiner*—Marivelisse Santiago-Cordero
(74) *Attorney, Agent, or Firm*—Squire Sanders & Dempsey LLP

(57) ABSTRACT

A method and a system for setting parameters of a cellular radio network, like a GSM network, in particular for access and handover, wherein the parameters are dynamically adjusted in accordance with measured signal level and quality statistics.

19 Claims, 3 Drawing Sheets

```
Downlink quality/level distribution:
                                                                        Share
Class                                                                      in
upper    DL      DL      DL      DL      DL      DL      DL      DL    range
range    q0      q1      q2      q3      q4      q5      q6      q7       (%)
(dBm)    (%)     (%)     (%)     (%)     (%)     (%)     (%)     (%)
------  ------  ------  ------  ------  ------  ------  ------  ------  ------
-100     0.07    0.03    0.02    0.05    0.09    0.11    0.07    0.02    0.46
-95      0.24    0.07    0.11    0.12    0.08    0.03    0.02    0.02    0.67
-90      1.36    0.12    0.11    0.06    0.05    0.03    0.01    0.00    1.74
-80      5.67    0.41    0.36    0.34    0.31    0.24    0.11    0.05    7.49
-70     25.36    1.66    1.54    1.26    1.10    0.68    0.20    0.08   31.88
> -48   50.39    2.04    1.89    1.48    1.19    0.59    0.15    0.01   57.75
        ------  ------  ------  ------  ------  ------  ------  ------  ------
sum     83.08    4.33    4.04    3.31    2.82    1.68    0.57    0.18  100.00
```

METHOD FOR SETTING PARAMETERS OF A CELLULAR RADIO NETWORK, IN PARTICULAR FOR ACCESS AND HANDOVER

FIELD OF THE INVENTION

The present invention relates to a method and a system for setting parameters of a cellular radio network, like a GSM network, in particular for access and handover.

BACKGROUND OF THE INVENTION

In current systems, the flexibility resulting from the existing large set of parameters included in the different algorithms cannot be fully used because of its complexity. In the planning stage, homogeneous networks are normally considered, as the large set of parameter makes the detailed planning process on a cell-by-cell basis a time-consuming task. As a consequence, the operators fix parameters to a common set of default values shared between cells, even if no optimum performance in terms of quality/capacity is reached. This homogeneity hypothesis may be far from reality, where interference or propagation severity can vary both in time and space over the network.

Moreover, a few operators extend the parameter optimization by classifying the cells in accordance with certain scenarios like rural, urban, tunnel, indoors etc. and or in accordance with the layer/band used (like Macro900/1800, Micro900/1800, Pico1800, Motorway900). So, the cells are divided into scenario groups or layer/band groups, and common default parameter values are shared which, however, are not optimum.

In those cases where new features are enabled, so-called field trials are required. During the tuning process, conclusions from parameter changes are difficult to derive, and final settings are nearly always on the safe side with its limited results. Moreover, such trials are normally focused on global parameters of features under study, and parameter optimization of adjacent cells is hardly ever done. So, differences between adjacent cells are rarely considered due to a high effort required. Therefore, the potential of so-called adjacency parameters is not fully exploited.

A final limited parameter tuning based on cell/area level performance indicators is normally carried out only over those cells where performance problems are existing.

Even if an optimum value were reached by means of the above-mentioned trials, changes in traffic or environment conditions, like the installation of new cells, changes of interference level by frequency re-planning etc., would force a further re-tuning process of the parameter base, where no automatic reactive process is currently in use. Such a situation could be analyzed as a result of slow trends, like the change of the number of user registrations, or fast changes, e.g. of the number of connections, during a short time period, like an hour or a day.

One of the critical causes of network variations is interference. Differences in propagation conditions between cells or changes in the frequency plan will produce variations in time or space. Adaptation to this variations would increase network performance, but would also require a very high tuning effort.

U.S. Pat. No. 5,241,685 A discloses a load sharing control for a mobile cellular radio system so as to achieve a load sharing between a first cell and a second cell adjacent to the first cell where each cell is serving a number of mobile devices. The first cell has a predetermined entering threshold which is a function of the received signal strength for mobile devices entering this cell from the second adjacent cell by means of handoff. A certain occupancy level indicates the occupied channels in relation to the available channels in the cell. For handover, the occupancy level of the first and second cells are determined, and it is further determined whether the second cell has a lower occupancy level than the first cell. Then, an entering threshold level for the second cell is determined which is a function of the received signal strengths for the mobile devises in the first cell about to enter the second cell. The entering threshold for the second cell is decreased if the occupancy level of the second cell is found to be lower than the occupancy level of the first cell, whereby the border between the first and second cells is dynamically changed. So, in this known system, the redistribution of the users for congestion relief is usually achieved by shrinking loaded cells through temporarily reduced margins for handovers between adjacent cells.

From this analysis, it is obvious that a great potential gain can be obtained from an automatic optimising and tuning process for load balance among cells, which would probably take advantage of cell/adjacent parameters. This would help planners in the tuning process and offer the operators cost savings and improved performance, despite changes of traffic environment both in space and time.

SUMMARY OF THE INVENTION

It is an object of the present invention to provide an automatic tuning process for parameters.

It is a further object of the present invention, to provide an automatic tuning process for parameters related to field strength level thresholds on a cell-by-cell basis.

It is a still further object of the present invention to provide a method and a system for setting parameters which can improve the performance and operability of the cellular radio network.

In order to achieve the above and further objects, according to a first aspect of the present invention, there is provided a method for setting parameters of a cellular radio network, like a GSM network, in particular for access and handover, characterized in that the parameters are dynamically adjusted in accordance with measured signal level and quality statistics.

According to a second aspect of the present invention there is provided a system for setting parameters of a cellular radio network, like a GSM network, in particular for access and handover, characterized by means for measuring signal level and quality statistics and further means for dynamically adjusting the parameters in accordance with the measured signal level and quality statistics.

So, an important point of the present invention is to adjust dynamically at least some of radio network parameters in accordance with measured signal level and quality statistics instead of using fixed parameter settings. The parameters of the cellular radio network are self-regulated and, thus, can improve the performance and operability of the network. No trial results are necessary anymore.

In a preferred embodiment of the present invention, mobile measurements, particularly measured received downlink levels and perceived channel quality, are collected from mobile devices in connected mode in every cell, the probability of perceiving a certain quality of service is extracted for each measured received level, and it is looked for a minimum level threshold with assures the minimum acceptable quality which a certain probability for access and handover.

On the basis of the results of the mobile measurements a probability density function PDF=$f_{cell}$(received level, perceived channel quality) for each cell may be set up from which the probability of perceiving a certain quality of service is extracted for each measured received level.

From the mobile measurements a quality-to-level relationship may be derived.

In particular, a mapping function between received downlink level from the broadcast channel and predicted quality of an assigned channel is defined by making use of the results of said mobile measurements. This function makes use of the mobile measurement reports extracted dynamically from the cellular radio network, easily differentiating among space (i.e. cell) and/or time (e.g. hour). In this way, the automation algorithm will cope with scenario differences (i.e. interference, propagation severity) due to traffic trend changes both in space and time.

Preferably, the quality-to-level relationship is used in mapping from operator quality requirements into the minimum level threshold for access and handover.

In a further preferred embodiment of the present invention, the probability of an acceptable quality of service is provided for a certain received level in accordance with a predetermined minimum acceptable quality value predefined in view of the operator quality requirements, and as a result of this process the mapping function is achieved.

Finally, the estimation of minimum level for acceptance will make use of the above mentioned relationship. Reckoning from this relation, minimum service probability selected by the operator is translated into the minimum required level.

Preferably, the above mentioned construction and mapping processes are replicated in the space or time dimension so as to be able to take into account network heterogeneities in space and time domains.

An advantage of the present invention is that traffic and environment changes are tracked by means of automatic parameter auto-tuning in order to achieve the best performance without user interaction. As a consequence, less parameters are required to be adjusted. Further, the present invention provides for a better performance since quality constraints are included in the tuning process so as to add more information in the control of the operational area of the cells concerned. In particular, better control of the operational area of the cells is achieved as adjacent parameters control the shape of the cell, and adaptation to cell differences can be easily carried out. Moreover, the present invention allows a user configurable solution, an easy implementation and the use of existing counters.

The present invention can be implemented in any kind of cellular mobile network systems like i.e. GSM or UMTS.

BRIEF DESCRIPTION OF THE DRAWINGS

In the following, the present invention will be described in greater detail based on a preferred embodiment with reference to the accompanying drawings in which.

DESCRIPTION OF THE PREFFERED EMBODIMENT

An automatic tuning process for parameters related to minimum field strength level thresholds on a cell-by-cell basis is described here.

A key factor resides on the ability to define a mapping function between received downlink level from the broadcast channel (BCCH) and predicted quality of assigned channel. This function will make use of mobile measurements reports extracted dynamically from the network, easily differentiating among cells or hour. In this may, the automation algorithm will cope with scenario differences (e.g. interference, propagation severity) due to traffic trend changes both in space and time.

Figure 1:
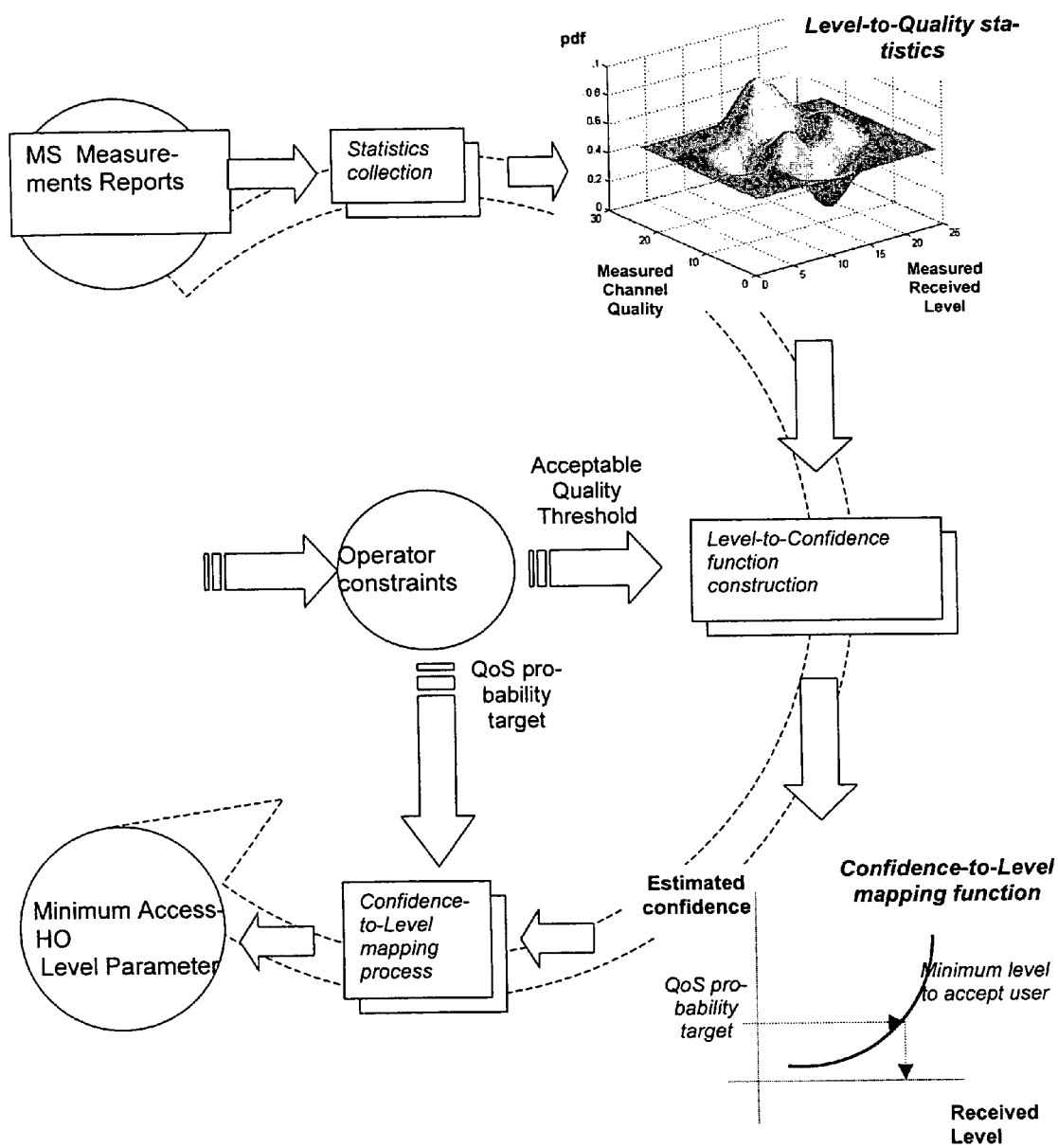
FIG. 1 shows a block diagram of a tuning system for automation of minimum level thresholds on a cell-by-cell basis in accordance with a preferred embodiment of the present invention.

FIG. 1 shows the flow of information from the network to the final parameter setting. Collection of mobile measurements from users in connected mode is undertaken in every cell. By means of further processing of these raw counters, the probability density function PDF=$f_{cell}$(Received Level, Perceived Channel Quality) is set up. From this piece of information, the probability of perceiving a certain quality of service may be extracted for every measured received level.

Once this Level-to-Quality relationship has been constructed, the next step aims at building the inverse Quality-to-Level function, which is used in the final mapping from operator quality requirements (i.e. minimum acceptable connection quality and likehood) into minimum level thresholds for access and handover.

At this stage, the minimum acceptable quality value accepted by the operator must be first defined, because it will be used to derive the probability of good quality service for a certain received level. As a result of this process, the mapping function which relates level values to service likelihood is achieved.

Finally, the estimation of minimum level for acceptance makes use of the relationship drawn before. Reckoning from this relation, minimum service probability selected by the operator is translated into the minimum required level.

Both construction and mapping processes are replicated in the space or time dimension so as to be able to take into account network heterogeneities in space (i.e. cell) and time (e.g. hour) domains.

As mentioned before, the definition of the relationship between received downlink level from BCCH channel and predicted quality of assigned channel is a key process.

Figures 2, 3:
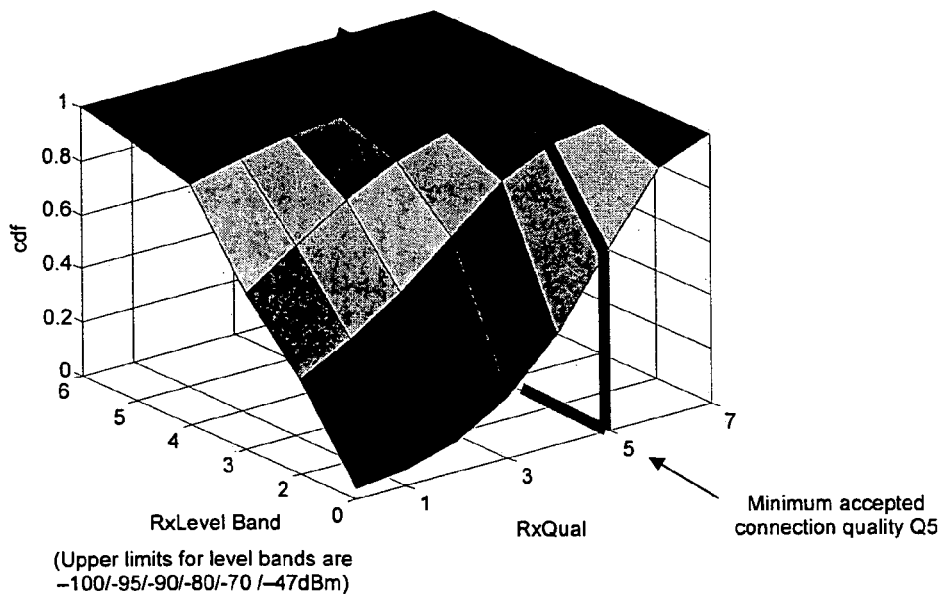
FIG. 2 shows an example of a table showing percentage of samples in predefined downlink quality (columns) and received level intervals (rows)
FIG. 3 shows a three-dimensional plot indicating a cumulative density function: extracted based on samples from the previous table, and a graphical representation of how a conclusion for the minimum required level is drawn from the quality requirements.

Usage of received level/received quality counters of received-level statistics feature in a base station equipment is envisaged as a main tool for this procedure. These counters show the probability density function of measured quality/level values as well as the relationship between received level and perceived quality probability. A tabular representation is depicted in FIG. 2 showing an example of a table structure of RxLev/RxQual counters from Rx-level statistics for downlink in a transmitting (trx) level, wherein RxLev and Rx-Level is the receiving level and RxQual is the receiving quality.

From this piece of information, the probability of perceiving at least a certain connection quality may be extracted for every measured received level. This three-dimensional function is depicted in FIG. 3 showing a three-dimensional plot of cumulative RxQual distribution from Rx-Level statistics on the basis of samples extracted from real data. So, this figure shows the appearance of cumulative quality distribution (i.e. probability of getting quality better than a certain value), for every level band. In the example, upper limits for 1,2,3,4,5,6 level bands are −100, −95, −90, −80, −70 and −47 dBm, respectively. It is worthwhile to note that they were extracted from a real network management system database. So, in FIG. 3, a 3-D plot of cumulative RxQual distribution for every level band is depicted. From this graph it can be clearly seen that the higher the received field-strength level is, the higher the probability is to get a certain quality degree result.

After minimum acceptable quality level has been predefined by the operator (e.g. Q0 to Q5 in FIG. 3), an intermediate mapping function is set up, relating to level and probability of achieving the quality mentioned before. This curve represents the intersection between the 3-D quality cumulative distribution surface and the plane defined by minimum acceptable quality suggested by the operator, which can be seen in the FIG. 3.

Figure 4:
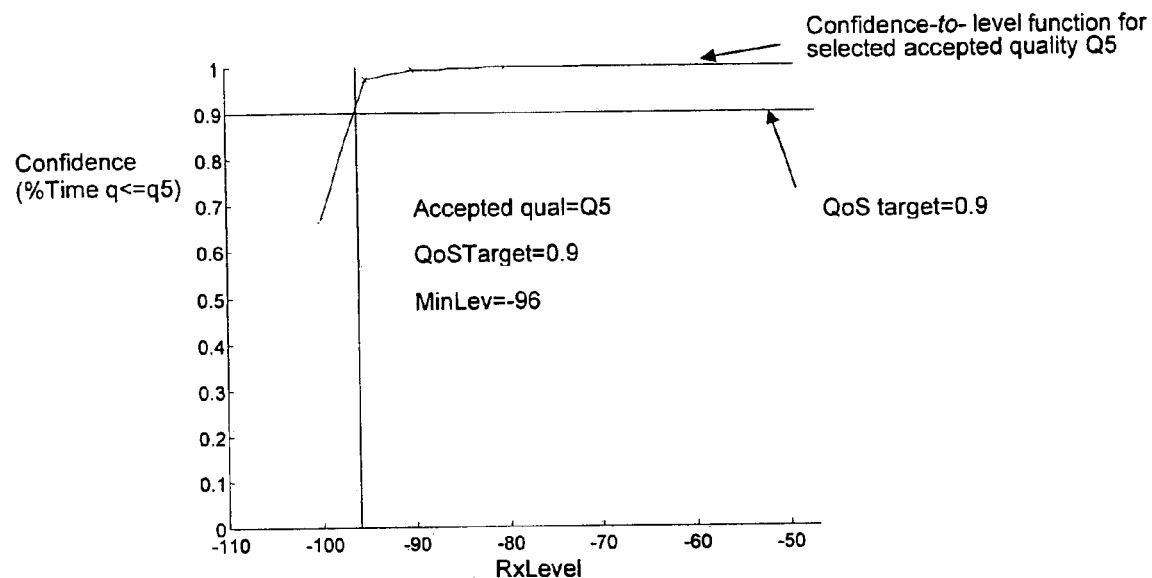
FIG. 4 shows a graph indicating the curve which represents the intersection between quality cumulative distribution surface from FIG. 3 and a plane defined by a minimum acceptable quality suggested by an operator.

In the last step it is searched for the minimum level which assures the minimum acceptable quality with a certain probability, considered as the Quality-of-Service target value (e.g. 90%), which can be interpreted as confidence. FIG. 4 shows this last mapping process, wherein QoS means quality-of-service.

The curve of FIG. 4 represents the intersection between quality cumulative distribution surface from FIG. 3 and the plane defined by a minimum acceptable quality suggested by the operator. The crossing point between the curve and the confidence degree (i.e. QoS target) is the suggested minimum level threshold represented by a vertical line.

Based on the same principles, a family of Quality/Confidence-to-Level curves in the following form may be derived for different quality-of-service targets.

$$\text{Min.ProposedLevel} = f_{Qual\text{-}to\text{-}lev}(\text{Min.accepted connection Quality, Confidence})$$

Figure 5:
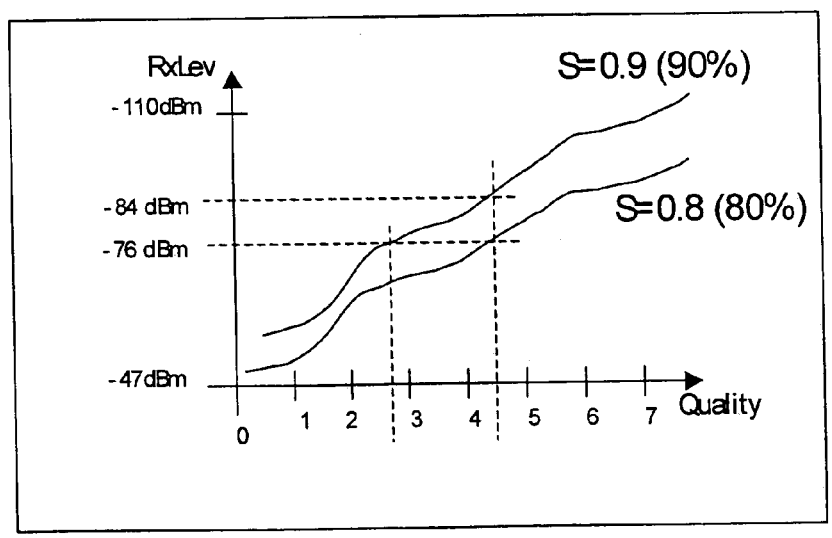
FIG. 5 shows a graph including a set of quality-to-level curves for different quality-of-service targets.

This set of curves is finally shown in FIG. 5. These curves define mapping curves which are obtained if the process represented in FIG. 4 is replicated br different acceptable quality and confidence values.

Although the invention is described above with reference to an example shown in the attached drawings, it is apparent that the invention is not restricted to it, but can vary in many ways within the scope disclosed in the attached claims.

The invention claimed is:

1. A method, comprising:
   adjusting parameters of a cellular radio network dynamically in accordance with measured signal level and quality statistics;
   collecting mobile measurements of measured received downlink levels and perceived channel quality from mobile devices in connected mode in every cell;
   extracting the probability of perceiving a certain quality of service for each measured received level;
   looking for a minimum level threshold which assures the minimum acceptable quality with a certain probability for access and handover; and
   based on the results of the mobile measurements, setting up a probability density function PDF $=f_{cell}$(received level, perceived channel quality) for each cell from which the probability of perceiving a certain quality of service is extracted for each measured received level, wherein the PDF is a function of the measured received level and the perceived channel quality.

2. The method according to claim 1, further comprising: deriving a quality-to-level relationship from said mobile measurements.

3. The method according to claim 2, further comprising: using said quality-to-level relationship in mapping from operator quality requirements into the minimum level threshold for access and handover.

4. The method according to claim 3, further comprising: providing the probability of an acceptable quality of service for a certain received level in accordance with a predetermined minimum acceptable quality value predefined in view of the operator quality requirements, and as a result of this process the mapping function is achieved.

5. The method according to claim 1, further comprising: defining a mapping function between received downlink level from a broadcast channel and predicted quality of an assigned channel by making use of the results of said mobile measurements.

6. A method according to claim 5, further comprising: replicating said mapping function in space and/or time dimension.

7. A system, comprising:
   a meaurement unit configured to measure signal level and quality statistics;
   an adjustment unit configured to dynamically adjust parameters of a cellular radio network in accordance with the measured signal level and quality statistics;
   a collection unit configured to collect mobile measurements of measured received downlink levels and perceived channel quality from mobile devices in connected mode in every cell;
   an extraction unit configured to extract the probability of perceiving a certain quality of service for each measured received level;
   an identification unit configured to look for a minimum level threshold which assures the minimum acceptable quality with a certain probability for access and handover; and
   a setup unit configured to set up, on the basis of the results of the mobile measurements, a probability density function PDF $=f_{cell}$(received level, perceived channel quality) for each cell from which the probability of perceiving a certain quality of service is extracted for each measured received levels,
   wherein the PDF is a function of the measured received level and the perceived channel quality.

8. The system according to claim 7, further comprising: a derivation means unit configured to derive a quality-to-level relationship from said mobile measurements.

9. The system according to claim 8, wherein said mapping unit is configured to use said quality-to-level relationship in mapping from operator quality requirements into the minimum level threshold for access and handover.

10. The system according to claim 9, further comprising:
   a provision unit configured to provide the probability of an acceptable quality of service for a certain received level in accordance with a predetermined minimum acceptable quality value predefined in view of the operator quality requirements, wherein as a result of this provision said mapping unit is configured to provide said mapping function.

11. The system according to claim 7, further comprising:
a mapping unit configured to define a mapping function between received downlink level from a broadcast channel and predicted quality of an assigned channel by making use of the results of said mobile measurements.

12. The system according to claim 11, wherein said mapping unit is configured to replicate said mapping function in space and/or time dimension.

13. A system, comprising:
measurement means for measuring signal level and quality statistics;
adjustment means for dynamically adjusting parameters of a cellular radio network in accordance with the measured signal level and quality statistics;
collection means for collecting mobile measurements of measured received downlink levels and perceived channel quality from mobile devices in connected mode in every cell;
extraction means for extracting the probability of perceiving a certain quality of service for each measured received level;
identification means for looking for a minimum level threshold which assures the minimum acceptable quality with a certain probability for access and handover; and
setup means for setting up, on the basis of the results of the mobile measurements, a probability density function PDF=fcell (received level, perceived channel quality) for each cell from which the probability of perceiving a certain quality of service is extracted for each measured received level,
wherein the PDF is a function of the measured received level and the perceived channel quality.

14. The system according to claim 13, further comprising:
derivation means for deriving a quality-to-level relationship from said mobile measurements.

15. The system according to claim 13, further comprising:
mapping means for defining a mapping function between received downlink level from a broadcast channel and predicted quality of an assigned channel by making use of the results of said mobile measurements.

16. The system according to claim 14, wherein said mapping means is configured to use said quality-to-level relationship in mapping from operator quality requirements into the minimum level threshold for access and handover.

17. The system according to claim 16, further comprising:
provision means for providing the probability of an acceptable quality of service for a certain received level in accordance with a predetermined minimum acceptable quality value predefined in view of the operator quality requirements, wherein as a result of this process said mapping means is configured to provide said mapping function.

18. The system according to claim 15, wherein said mapping means is configured to replicate said mapping function in space andlor time dimension.

19. An apparatus, comprising:
a reception unit configure to receive measured signal level and quality statistics and collected mobile measurements of measured received downlink levels and perceived channel quality from mobile devices in connected mode in every cell of a cellular radio network;
an adjustment unit configured to dynamically adjust parameters of the cellular radio network in accordance with the measured signal level and quality statistics;
an extraction unit configured to extract the probability of perceiving a certain quality of service for each measured received level;
an identification unit configured to look for a minimum level threshold that assures the minimum acceptable quality with a certain probability for access and handover; and
a setup unit configured to set up, on the basis of the results of the mobile measurements, a probability density function PDF=fcell (received level, perceived channel quality) for each cell from which the probability of perceiving a certain quality of service is extracted for each measured received level,
wherein the PDF is a function of the measured received level and the perceived channel quality.

* * * * *